United States Patent
Buil et al.

(10) Patent No.: US 6,718,307 B1
(45) Date of Patent: Apr. 6, 2004

(54) SPEECH INPUT DEVICE WITH ATTENTION SPAN

(75) Inventors: Vincentius P. Buil, Eindhoven (NL);
Paul A. P. Kaufholz, Eindhoven (NL);
Lucas J. F. Geurts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/392,687

(22) Filed: Sep. 9, 1999

(30) Foreign Application Priority Data

Jan. 6, 1999 (EP) .......................................... 99200014

(51) Int. Cl.⁷ ............................................ G10L 15/00
(52) U.S. Cl. ...................................... 704/270; 704/275
(58) Field of Search ................................ 704/246, 251, 704/256, 270, 271, 275

(56) References Cited

U.S. PATENT DOCUMENTS

| | | | | |
|---|---|---|---|---|
| 4,528,687 A | * | 7/1985 | Noso et al. ............... | 704/275 |
| 5,577,164 A | * | 11/1996 | Kaneko et al. ............ | 704/275 |
| 5,983,186 A | * | 11/1999 | Miyazawa et al. ......... | 704/275 |
| 6,052,666 A | * | 4/2000 | Diehl et al. ............... | 704/275 |
| 6,070,140 A | * | 5/2000 | Tran ........................ | 704/275 |
| 6,075,575 A | * | 6/2000 | Schein et al. ............. | 348/734 |
| 6,188,986 B1 | * | 2/2001 | Matulich et al. .......... | 704/275 |
| 6,253,184 B1 | * | 6/2001 | Ruppert ................... | 704/275 |

OTHER PUBLICATIONS

"Designing Characters for Microsoft Agent", Aug. 1997.
IBM Technical Bulletin, vol. 41, No. 1, Jan. 1998, XP 00772167.
IBM Technical Bulletin, vol. 37, No. 10, Oct. 1994, XP 000475611.

* cited by examiner

Primary Examiner—Daniel Abebe
(74) Attorney, Agent, or Firm—Laurie E. Gathman

(57) ABSTRACT

A speech input based input device (100) has a standby mode in which it can only recognize its activation instruction and an operational mode in which it can recognize commands for control of an apparatus. When the device (100) recognizes in the speech input its activation instruction it switches into the operational mode. The device remains in the operational mode for as long as commands are recognized and returns to the standby mode if no commands are recognized for a given period of time. The device according to the invention may have a signaling module (126) for producing audible signals to inform the user about the mode or mode changes of the device.

15 Claims, 3 Drawing Sheets

SPEECH INPUT DEVICE WITH ATTENTION SPAN

BACKGROUND OF THE INVENTION

The invention relates to a device for controlling an apparatus, the device comprising: a receiving unit for receiving speech input, an analyzing unit for analyzing the received input for recognizing a command, a transmitting unit for transmitting the command to the apparatus, and an activation unit for switching the device from a standby mode, in which the device is not operational for actual control of the apparatus, to an operational mode, in which the device is operational for actual control of the apparatus.

The invention further relates to a remote control comprising such a device.

The invention further relates to a system comprising a plurality of such devices.

The invention further relates to a method of controlling an apparatus, the method comprising: a receiving step for receiving speech input, an analyzing step for analyzing the received input for recognizing a command, a transmitting step for transmitting the command to the apparatus, and an activation step enabling the recognizing and transmitting of the command.

Such a device can be implemented as an agent using the Microsoft Agent API (Application Programming Interface). The document "Designing Characters for Microsoft Agent", August 1997, available from Microsoft Corporation, describes how to develop an agent as part of the interface of an apparatus. In the context of Microsoft Agent, an apparatus is a client application program running on a computer. The agent is displayed to the user as a character by means of different animations, whereby the actual animation is chosen in dependence on the actual state of the agent. In addition to commands via mouse and keyboard, the agent may receive commands via speech input. To realize this, the users puts the agent into the listening mode by pressing the so-called push-to-talk hot key. Then the agent becomes sensitive to speech input and the user may speak the desired command or commands. To visualize that the agent has entered the listening state, the corresponding listening animation is displayed on the screen. In the listening state, the agent tries to recognize commands in the speech input. If the agent has recognized a command, this command is transmitted for execution to the client application program to which the agent is assigned.

SUMMARY OF THE INVENTION

It is an object of the invention to provide a device as described in the preamble which is more user-friendly than the known device. This object is achieved according to the invention in a device which is characterized in that the activation unit is arranged to receive speech input and to analyze this received speech input for recognizing an activation instruction and to switch the device form the standby mode to the operational mode upon recognizing the activation instruction. The user can put the device according to the invention into the operational mode by speaking the activation instruction and the user does not need to push a special key. This means that this device does not need such a special key. Furthermore, the user need not physically handle the device since only speech input is required and the operation is thus completely hands free. This is particularly advantageous in a situation where a user is performing another task in addition to controlling the apparatus. An example of such a situation is driving a car and meanwhile operating the car radio or a car telephone. Since there is no need for physical contact with the device according to the invention, the user may be even a certain distance away from the device as long as the input spoken by the user can be received in the device.

An embodiment of the device according to the invention is described in claim 2. Since this device switches autonomously from the operational mode to the standby mode if no commands are given for a certain period, there is no need for the user to explicitly switch the device to the standby mode. Because of the autonomous switching to the standby mode, there is very little chance that the device accidentally remains in the operational mode. The device should not remain accidentally in the operational mode since then the device may recognize commands in any ongoing conversation and may transmit these unintentional commands for execution to the controlled apparatus. When the user has spoken the activation instruction, the device offers the user an attention period in which the user may speak any of the commands controlling the application. When such a command is not given during the attention period, the device returns to its standby mode. This mechanism is also a safeguard against unintended operation of the device and corresponding unintended control of the apparatus. If the device in its standby mode accidentally picks up the activation instruction from a conversation, it subsequently remains operational for only its attention period and then switches back to its standby mode. This reduces the chance of unintended control of the apparatus.

An embodiment of the device according to the invention is described in claim 3. This device notifies the user by means of an audible signal when it enters the operational mode and has become sensitive for commands in the speech input. For this notifying purpose, an audible signal is superior to a visual signal since a visual signal requires the user to continuously pay attention to a screen or part of the device displaying the visual signal. A visual signal may therefore remain unnoticed, especially in the case of an unintentional entry into the operational mode, thus leaving the user unaware of the change of mode of the device. A further advantage of this device is that it can completely operate without a display screen, thus saving costs of manufacturing.

An embodiment of the device according to the invention is described in claim 4. The attention signal is used to inform the user of the progression of time during the attention period and to notify the user again that the device is in the operational mode, ready to receive commands via speech input.

An embodiment of the device according to the invention is described in claim 5. The end signal notifies the user that the device is no longer in the operational mode and thus no longer sensitive to commands in the speech input. This device allows for a user-friendly and flexible control of an apparatus because of the easy and clear switching between the standby mode and the operational mode. Upon recognizing the activation instruction, the device produces a start signal informing the user of the start of an attention period during which the device is sensitive to commands in the speech input. The device transmits recognized commands to the apparatus for execution. If no command is given and recognized during a predetermined period, the device times out and produces an end signal indicating the end of the attention period and that the device is no longer sensitive to commands in the speech input. As long as the period of time between two commands is shorter than the predetermined "time out" period, the device remains in the operational mode and ready to receive commands in the speech input.

It is well known to use a remote control to control an apparatus like a television set or a hi-fi set. A function of the controlled apparatus is activated or adjusted by pressing a corresponding key or combination of keys on the remote control. Pressing a key on the remote control results in the transmission of a wireless, e.g. infrared, coded signal by the remote control. This signal is received in the apparatus and translated into the corresponding action. Examples are adjusting the volume setting of the hi-fi set and selecting a channel on the television set. Thus a command is given by pressing a key on the remote control and the command is executed by the apparatus controlled by the respective remote control.

A remote control can advantageously be equipped with a device according to the invention. Then some of the commands supported by the remote control can be given as speech input. This reduces the required number of keys on the remote control, in the case where the same commands are to be supported. Alternatively, in the case where new commands are supported by the device according to the invention, the remote control can support the larger number of commands without the need to increase the number of keys. Furthermore, all commands of the remote control may be supported by the device according to the invention, thus making it possible to have a remote control with no command keys at all.

A system comprising a number of apparatuses to be controlled comprises respective devices for this control. In such a system it is advantageous that each device has its own unique activation instruction, because then it is easy to put a single device in its operational mode and to leave the other devices in the standby mode. The user simply speaks the activation instruction of the device controlling the desired apparatus and subsequently speaks commands for this apparatus. The other apparatuses will not respond, even if some of the commands are the same as for the currently controlled apparatus, since their devices are in the standby mode not recognizing and transmitting such commands. One or more of the devices of this system may be integrated into one overall device. This overall device performs the tasks of one of the devices after the respective activation instruction has been received and recognized.

The controlled apparatus can be one of various kinds. For instance, it may be a single standalone apparatus like a television set or an application program running on a computer. To this end, the device according to the invention can have different embodiments. It can be a separate device, like a remote control, which operates in a standalone way and transmits its recognized commands to an apparatus via a wireless link. Also, it can be implemented as a software program running on a computer and forming part of an interface to an application program. In that case, the device transmits commands to the controlled application program as parameters in software protocols, whereby one software components calls another software component with a certain set of parameters. Furthermore, the device can be integrated in the controlled apparatus, e.g. as a dedicated hardware unit, then forming a single physical apparatus. In that case there is no explicit transmittal of the command, but the device may directly control the controlled apparatus.

It is a further object of the invention to provide a method as described in the preamble which is more user-friendly than the known method. This object is achieved according to the invention in a method which is characterized in that the activation step comprises the sub-steps of: receiving speech input, analyzing the received input for recognizing an activation instruction, and enabling the recognizing and transmitting of the command upon recognizing the activation instruction.

BRIEF DESCRIPTION OF THE DRAWING

The invention and its attendant advantages will be further elucidated with the aid of exemplary embodiments and the accompanying schematic drawings, wherein.

DESCRIPTION OF THE PREFERRED EMBODIMENTS

Figure 1:
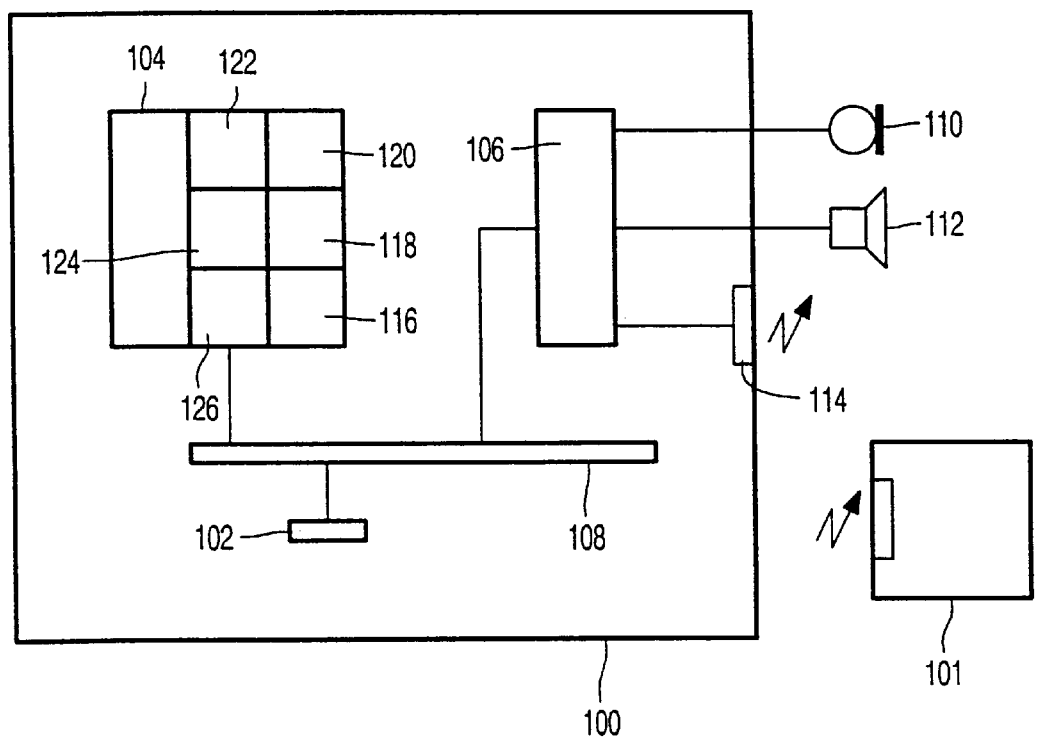
FIG. 1 schematically shows the most important elements of the device according to the invention.

FIG. 1 schematically shows the most important elements of the device according to the invention. The device 100 is to remotely control with speech input an apparatus 101. The device is implemented on the palm PC Nino of Philips. The palm PC is a computer with small physical dimensions, so that it can easily be held in the hand, running the operating system Windows CE. However, the device can also be implemented on other suitable types of computers. The device has a processor 102 for executing program instructions loaded in a working memory 104. The device has an interface 106 for communicating with peripheral equipment. Furthermore, the device has a bus 108 for the exchange of commands and data between the various components. Attached to the device is a microphone 110 for the reception of speech from the user of the device and a loudspeaker 112 for producing audible signals for the user. Furthermore, the device has a transmitter 114 for transmitting commands in the form of infrared signals to the apparatus 101 controlled by the device.

The various tasks of the device are executed by program modules that are loaded thereto in the working memory. There is a receiving module 116 for receiving the speech input captured by the microphone 110. The speech input is analyzed in an analyzing module 118 in order to recognize certain words and phrases. In the standby mode of the device, the analyzing module tries to recognize the word "Nino" in the speech input. This word is the activation instruction for the device and when it has been recognized among the speech input, the device is switched to its operational mode by the activation unit 120. In the operational mode, the analyzing module tries to recognize commands from a predetermined set of commands that are used to control the apparatus 101. When a command has been recognized, a transmitting module 122 prepares the command to be sent by transmitter 114 as an infrared signal. Furthermore, the device has a timer module 124 for measuring the time lapsed after the recognition of the activation instruction or after the recognition of a command. When more than a predetermined period lapses since the recognition, the device returns from the operational mode into the standby mode. Alternatively, the device may be switched from the operational mode to the standby mode using a special standby command. In that case, the set of commands that are recognized in the operational mode contains the standby command which is, when recognized in the speech input, not transmitted to the apparatus 101 but which results in the device going into standby mode. So in this alternative, the user can explicitly switch to the standby mode.

The modules handling the speech recognition have been implemented on the basis of the speech recognition software package Vocom. The device 100 has a standby mode and an operational mode to reduce the chance of sending unintentional commands to the apparatus. If the device would only have an operational mode, there is a chance that a command is accidentally recognized in any ongoing conversation. Such recognized command will be transmitted to the apparatus 101 and executed by it. In the standby mode, the device is only sensitive for recognizing the activation instruction and will not respond to other spoken commands. This reduces the risk of recognizing and execution of an unintentional command. An error occurring due to recognition of an unintentional command is also known as an insertion error, since it appears as if a command has been inserted erroneously.

An embodiment of the device according to the invention has a signaling module 126 for producing audible signals to inform the user about the mode or mode changes of the device. If the device is switched into the operation mode, the signaling module produces a start signal which is the phrase "Yes?". This phrase is reproduced via loudspeaker 112. The start signal indicates the start of the attention period during which the device is sensitive to commands in the speech input for the purpose of controlling the apparatus. When no command is recognized after a predetermined period, which is shorter than the attention period, the signaling module produces an attention signal to inform the user of the lapse of time in the attention period. The attention signal is implemented as the phrase "Well?" and indicates to the user that the device is still in the operational mode awaiting a command in the speech input. When no command is recognized during the whole of the attention period, the signaling module produces an end signal to indicate that the device has returned to the standby mode. The end signal is implemented as a sound like a yawn to mimic the losts of interest from a listener. Alternative to the above, the activation of the attention span can be indicated auditively by generating a non-obtrusive sound during the attention span. In that case, the process of the attention span can be indicated by a change in generated sound. The generated sound is than changed in coherence with the progression of the attention span, e.g. the frequency of the sound becomes higher and higher when the attention span is running towards its end.

Figure 2:
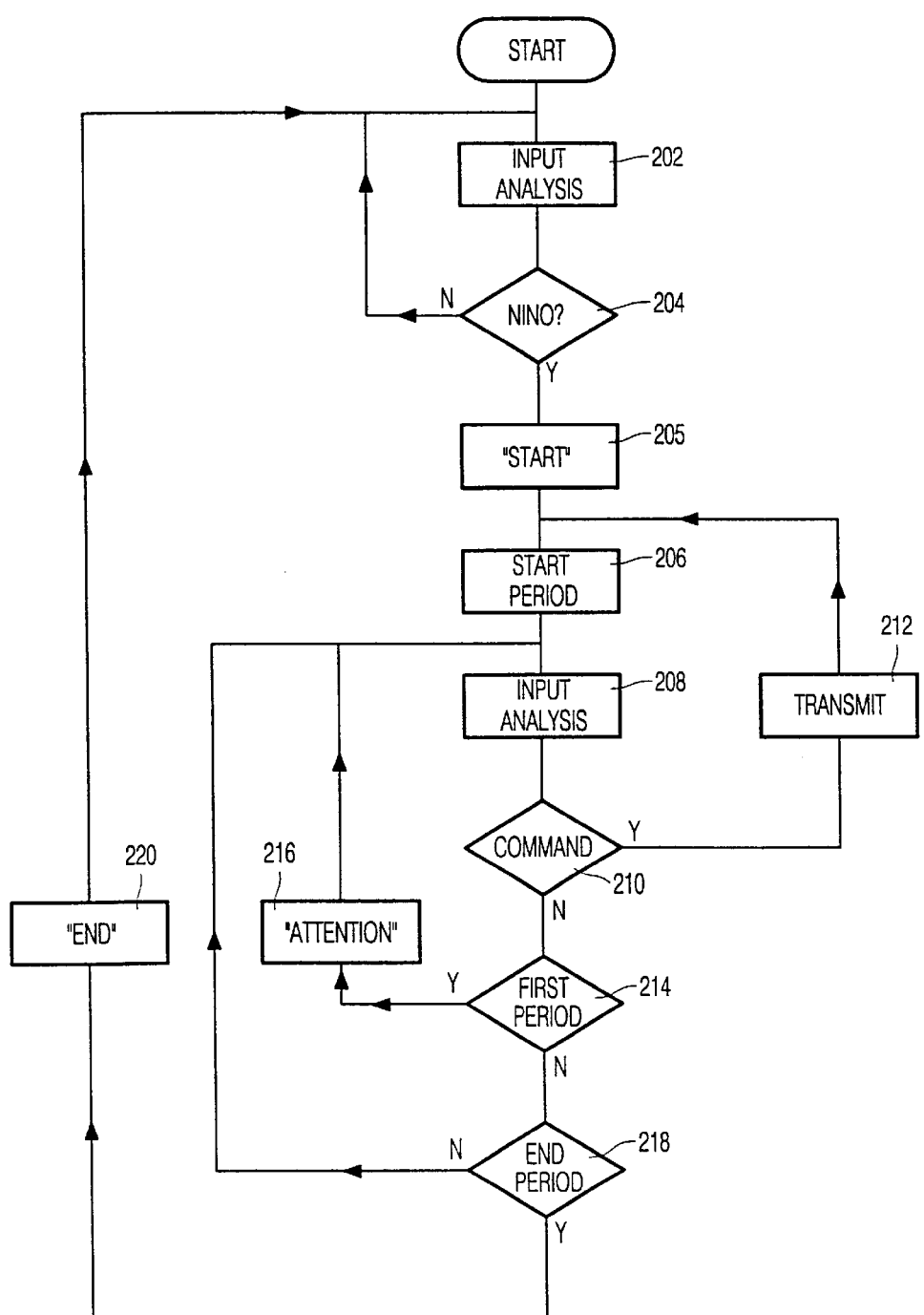
FIG. 2 shows a flow chart with the major steps in an embodiment of the device of the invention.

FIG. 2 shows a flow chart with the major steps in an embodiment of the device of the invention. In step 202, the speech input is analyzed and in step 204 it is determined whether the activation instruction "Nino" has been recognized in the input. If this is not the case, then control is passed back to step 202 for analyzing further speech input. If the activation instruction has been recognized in step 204, then in step 205 the start signal is given and in step 206 the attention period of the device is started. The device is then active to receive and recognize commands in the speech input to control the apparatus in step 208. If in step 210 a command is recognized this command is transmitted in step 212 to the controlled apparatus. The device remains in its operational mode for further receipt of commands in the speech input and therefore a new attention period is started in step 206. If in step 210 it is determined that no command is recognized, (this can also be caused by the fact that no command is given at all) it is determined in step 214 if the first part of the attention period has already lapsed. If that first period has lapsed, then the attention signal is given in step 216 and control is passed to step 208 for analysis of the speech input for the remaining of the attention period. If still no command is recognized and while the attention signal has been given, it is determined in step 218 whether the whole of the attention period has lapsed. If not, then control is passed back to step 208 for the analysis of further speech input. However, if the attention period has lapsed, then in step 220 the end signal is given and the device is switched to the standby mode. Thereto, execution continues in step 202 for analyzing whether the activation signal is given again in the speech input.

Figure 3A:
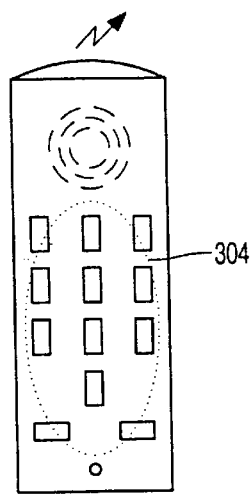
FIG. 3A shows the top view of a remote control according to the invention.
Figure 3B:
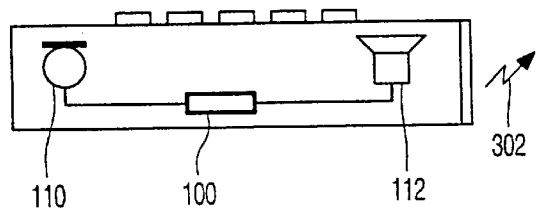
FIG. 3B shows an open side view of the remote control according to the invention.

FIG. 3A shows the top view of a remote control according to the invention and FIG. 3B shows an open side view of the remote control according to the invention. The remote control has a device 100 as described in connection with FIG. 1. The remote control further has a microphone 110 for the receipt of speech input and may have a loudspeaker 112 for reproducing signals to the user. A command spoken by the user and recognized by the device 100 is transmitted to the controlled apparatus as an infrared signal 302. The remote control may have a number of command keys 304 for control of the controlled apparatus. In that case, a key may correspond to a command that can also be given as spoken command or may correspond to a command that can exclusively be given by pressing that key. In an embodiment of the remote control according to the invention, all commands supported by the remote control can be recognized by device 100 in the speech input. In that embodiment, no command keys are necessary on the remote control.

Figure 4:
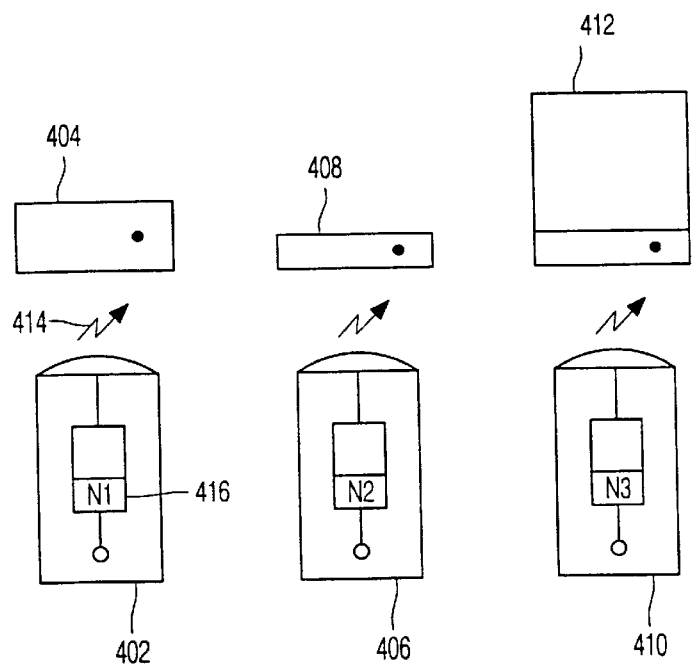
FIG. 4 shows a system with a plurality of devices according to the invention.

FIG. 4 shows a system with a plurality of devices according to the invention. Each of these devices is for the control of a respective apparatus in the system. Device 402 controls apparatus 404, device 406 controls apparatus 408 and device 410 controls apparatus 412. The control commands are sent by the remote control as infrared signals, whereby each device uses coded signals specifically for its own controlled apparatus. Due to this unique coding, the infrared signal 414 transmitted by device 402 will only have effect for apparatus 404, while the signal may reach each of the apparatuses. According to the invention, each of the devices has its own unique activation instruction, e.g. as symbolized for device 402 by 416, to switch the particular device from the standby mode into the operational mode. The user can speak the activation instruction of the device controlling the desired apparatus and that device will switch to the operational mode. Subsequent commands spoken by the user will only be recognized by that device and transmitted by it for control of its related apparatus. The other devices remain in their standby mode and will not transmit any command. So even if one or more commands are the same for different devices, there will be no problem in controlling the apparatus, since it is easily possible to switch only one device in the operational mode.

An alternative is to combine the device 402, 406 and 410 into one control device. This is then connected via a bus to the controlled apparatuses and addresses a specific apparatus when the unique activation instruction of that apparatus has been recognized.

In a further embodiment, the device of the invention is equipped with a display. This may be a display of the controlled device. In this embodiment the start of the attention span is indicated on the display by the appearance of an icon. Alternatively, it may be that an iron is used to represent the device and that it changes appearance when the device changes from the standby mode into the operational mode. The icon can then also be used to indicate that a command is recognized in the operational mode, e.g. when the case is an animated person this person may nod when a command is correctly recognized. The progression of the attention span may then be indicated by changing the size of the icon; so the icon shrinks in relation to the progression of time during the attention span.

What is claimed is:

1. A device for controlling an apparatus, the device comprising:

a receiving unit for receiving speech input, an analyzing unit for analyzing the received input for recognizing a command, and an activation unit for switching the device from a standby mode, in which the device is not operational for actual control of the apparatus, to an operational mode, in which the device is operational for actual control of the apparatus characterized in that the activation unit is arranged to switch the device from the standby mode to the operational mode upon the analyzing unit recognizing an activation instruction in the received speech input, said device being arranged to determine, in the operational mode, whether any command is recognized during a predetermined attention period, the attention period comprising a plurality of portions, said device being arranged to generate an attention signal if no command is recognized in at least one of the portions and to leave the operational mode and to enter the standby mode if no command is recognized during the attention period.

2. A device as claimed in claim 1, being arranged to produce, upon entry into the operational mode, an audible start signal, indicating the start of an attention period during which the device remains in the operational mode.

3. A device as claimed in claim 2, wherein said attention signal comprises an audible attention signal.

4. A device as claimed in claim 2, being arranged to determine, in the operational mode, whether any command is recognized during a predetermined period and being arranged to leave the operational made and to enter the standby mode if no command is recognized during the predetermined period, and to produce in that case an audible end signal, indicating the end of the attention period.

5. An apparatus comprising a device according to claim 1.

6. A remote control comprising a device according to claim 1.

7. A system comprising a plurality of devices, each as claimed in claim 1 and each controlling a respective apparatus, wherein each device is arranged to recognize its own unique activation instruction.

8. A device for controlling an apparatus, the device comprising:

a receiving unit for receiving speech input, an analyzing unit for analyzing the received input for recognizing a command, and an activation unit for switching the device from a standby mode, in which the device is not operational for actual control of the apparatus, to an operational mode, in which the device is operational for actual control of the apparatus, characterized in that the activation unit is arranged to switch the device from the standby mode to the operational mode upon the analyzing unit recognizing an activation instruction in the received speech input, said device being arranged to determine, in the operational mode, whether any command is recognized during a predetermined attention period, the attention period comprising a plurality of portions, said device being arranged to generate an attention signal if no command is recognized in at least one of the portions and to leave the operational mode and to enter the standby mode if no command is recognized during the attention period, and being arranged to produce, after entry into the operational mode, a repeating audible sound indicating an attention period.

9. A method of controlling an apparatus comprising:

receiving speech input in a receiving unit of a device for controlling said apparatus;

analyzing said received speech input to recognize a command;

detecting an activation instruction in said received speech input;

upon detecting said activation instruction, switching said device from a standby mode in which said device is not operational for actively controlling said apparatus to an operational mode in which said device is operational for actively controlling said apparatus;

determining in said device, when said device is in said operational mode, whether any command is recognized during a predetermined attention period, the attention period comprising a plurality of portions;

generating an attention signal if no command is recognized in at least one of the portions of the attention period; and switching said device to said standby mode if no command is recognized during said attention period.

10. A method as claimed in claim 9 further comprising:

producing in said device an audible start signal that indicates the start of an attention period during which said device remains in said operational mode.

11. A method as claimed in claim 10 wherein the attention signal comprises an audible attention signal.

12. A method as claimed in claim 10 further comprising:

determining in said device during said operational mode whether any command is recognized during a predetermined period;

switching said device from said operational mode to said standby mode if no command is recognized during said predetermined period; and producing in said device an audible end signal that indicates an end of said attention period.

13. A method of controlling an apparatus comprising:

receiving speech input in a receiving unit of a device for controlling said apparatus;

analyzing said received speech input to recognize a command;

detecting an activation instruction in said received speech input;

upon detecting said activation instruction, switching said device from a standby mode in which said device is not operational for actively controlling said apparatus to an operational mode in which said device is operational for actively controlling said apparatus;

determining in said device, when said device is in said operational mode, whether any command is recognized during a predetermined attention period, the attention period comprising a plurality of portions;

generating an attention signal if no command is recognized in at least one of the portions of the attention period;

switching said device to said standby mode if no command is recognized during said attention period; and producing in said device a repeating audible sound that indicates said attention period while said device remains in said operational mode.

14. A method for controlling a plurality of devices wherein each device controls a respective apparatus using the method set forth in claim 9, wherein each device of said plurality of devices has its own unique activation instruction.

15. A method for controlling a remote control comprising the steps set forth in claim 9.

* * * * *